3,050,390
PHOTOPOLYMERIZATION OF VINYL MONOMERS BY MEANS OF SILVER COMPOUNDS AS CATALYSTS PROMOTED BY AMPHOTERIC METAL OXIDES
Steven Levinos, Vestal, and Fritz W. H. Mueller, Binghamton, N.Y., assignors to General Aniline & Film Corporation, New York, N.Y., a corporation of Delaware
No Drawing. Filed Oct. 6, 1958, Ser. No. 765,275
25 Claims. (Cl. 96—35)

The present invention pertains to the formation of solid polymers by photopolymerization of normally liquid or solid ethylenically unsaturated monomers while employing a radiation-sensitive silver compound as the catalyst and a metal oxide capable of forming amphoteric bases as a promoter for the catalyst.

It has been proposed to photopolymerize ethylenically unsaturated monomers in the presence of water while utilizing a radiation-sensitive silver compound as the catalyst by irradiating the monomer and silver compound with rays having a wave length of from $10^{-1}$ to $10^{-10}$ centimeters. Polymerization in this fashion to yield solid polymers may be carried out in bulk or imagewise in coatings containing the monomer and catalyst. It was later determined that such photopolymerization could be more efficiently controlled when employing the silver salts in the form of light-sensitive photographic emulsions of various types. Thus, by use of such emulsions which are amenable to sensitization by optical and chemical sensitizers employed in the photographic industry, it was possible to make the monomeric materials selectively reactive to radiations of various wave lengths. Of particular importance is the fact that in both of the outlined procedures resorting to silver compounds for catalyzing the photopolymerization, the reaction could be effected with visible light, contrary to the usual experience in this field.

We have now realized a further improvement in the photopolymerization of ethylenically unsaturated monomers (solid or liquid) with silver compound catalysts in that we have discovered that the catalytic activity of the silver compounds may be greatly promoted or enhanced by the use therewith of small amounts of metal oxides capable of forming amphoteric bases.

An additional and very important finding is that our catalytic system becomes even more effective when there are employed small amounts of optical sensitizing dyes such as erythrosin, eosin, pinacyanol, 1,1'-diethyl-2,2'-cyanine iodide and similar cyanine sensitizing dyes disclosed in Chapter 7 of "Photography, Its Materials and Processes," by C. D. Neblette (Fifth Edition), published by D. Von Nostrand Company, Inc., New York City.

The direct formation of solid polymers by irradiation, with radiations ranging in wave length from $10^{-1}$ to $10^{-10}$, of ethylenically unsaturated monomers which are normally liquid or solid (at room temperature) in the presence of a radiation-sensitive silver compound as a catalyst and a small amount of an amphoteric metal oxide as a promoter for the catalyst with or without optical sensitizing dyes constitutes the purposes and objects of our invention.

The particular mechanism by which photopolymerization is achieved by use of silver compound catalysts has not been ascertained and is not self-evident. It is possible that the photopolymerization is due to the presence of free radicals produced during the decomposition of the radiation-sensitive silver compounds. On the other hand, the impact on the reaction of the metal oxides is unknown. The fact is, however, that when the amphoteric metal oxides are present, they materially reduce the time necessary to convert the normally liquid or solid monomers into solid polymers. This is particularly true when the silver compound itself is capable of further oxidation, i.e., silver nitrite and/or the amphoteric metal oxide is utilized with another compound of the same metal which is capable of ready oxidation, such as, for example, zinc sulfite.

The characteristics of the radiation-sensitive silver compounds used as catalysts are generic to such a class and it is not restricted to a few members thereof. Silver compounds which are very active oxidation agents, such as, for example, silver perchlorate, are excluded since these react explosively with ethylenically unsaturable monomers even in the dark and cause such compounds to undergo oxidation rather than polymerization. Similarly, silver compounds which decompose when stored in darkness are not contemplated for use.

Examples of silver compounds possessing the necessary prerequisities are: silver acetate, silver acetylide, silver ortho-arsenate, silver ortho-arsenite, silver benzoate, silver tetraborate, silver bromate, silver bromide, silver carbonate, silver chloride, silver chromate, silver citrate, silver ferrocyanide silver fluoride, silver iodide, silver lactate, silver fluosilicate, silver cyanide, silver thiocyanate, silver laurate, silver levulinate, silver phenol-sulfonate, silver ortho-phosphate, silver myristate, silver nitrate, silver nitrite, silver picrate, silver nitro-prusside, silver selenate, silver selenide, silver potassium cyanide, silver oxalate, silver oxide, silver ammonium hydroxide (ammoniacal silver oxide), silver palmitate, silver propionate, silver salicylate, silver sulfide, silver acridine, silver hyponitrite, silver azide, silver tellurate, silver sulfite, silver thionate, silver sulfamate, silver stearate, silver sulfate, silver tartrate, silver thiosulfate, silver tungstate, silver molybdate, silver iridate, silver formate, silver malonate, silver succinate, silver glutarate, silver adipate, silver albuminates, silver caseinates, addition compounds of benzidine and silver nitrate, addition compounds of silver nitrate and quinoline, silver vanadate, or the silver salts of U.S.P. 2,193,574 such as the silver salt of p-nitrooxanilic acid, the silver salt of 6,6'-dinitro-ortho-tolidine, dioxamic acid, the silver salt of benzene sulfinic acid, the silver salts of U.S.P. 2,066,582, silver salts of the amino acids such as those described in U.S.P. 2,164,687 and U.S.P. 2,454,011, i.e., silver lysalbinate, silver gelatose, etc.

Only catalytic amounts of the silver compound are needed. This means that the silver compound will be employed in an amount which is exceedingly small when measured against the quantity of monomer. We have effectively used a silver compound (silver sulfite) in an amount by weight as low as $1/800,000$ of the weight of the monomer. Greater amounts of the silver catalyst by weight may be employed but are generally found to be unnecessary. For example, we have obtained excellent results with amounts of silver compound ranging up to 10% by weight of the monomer.

The amphoteric metal oxides which we have found to be active promoters for the silver compounds are zinc oxide, titanium dioxide, zirconium dioxide and silicon dioxide. These oxides are all available on the open market and may be obtained in various physical forms. For example, silicon dioxide is sold by several companies in the form of a colloidal dispersion or in the form of a fine powder which may readily be dispersed. There is, therefore, no dfficulty in obtaining these oxides for use in our procedure.

Our experiments have indicated that, while the silver compounds alone will effect photopolymerization of ethylenically unsaturated monomers, the rate of polymerization is greatly enhanced when the silver compound is used with an oxide of the stated class. For example, a mixture of acrylamide with a cross-linking agent such as N,N'-methylene-bis-acrylamide was photopolymerized in the presence of silver nitrate in a period of about 11 minutes. When to the same reaction mixture there was added a small amount of zinc oxide, photopolymerization under the same conditions ensued in 7 minutes. In each case, solid high molecular weight products were obtained.

The fact that the amphoteric metal oxides reduce the time necessary for the silver compounds to effect photopolymerization spells out a synergistic effect in the use of the catalyst on the one hand and the promoter therefor on the other hand. The effect, as previously explained, is not evident and appears to be impossible of ascertainment.

The quantity of amphoteric metal oxide employed whether polymerization be effected in bulk or imagewise is quite small, ranging in an amount from about .01 to 1% by weight of the monomer. Larger amounts may, of course, be employed but no improvement in results follows from such larger use. As a matter of fact, since excesses of the metal oxide will settle out from a water solution of the components, excesses should be avoided.

Any normally liquid to solid ethylenically unsaturated monomer or mixtures thereof may be photopolymerized by irradiation in the presence of the non-oxidizing silver compounds and the aforesaid promoter therefor. Suitable monomers are, for example, acrylamide, acrylonitrile, N-ethanol acrylamide, methacrylic acid, acrylic acid, calcium acrylate, methacrylamide, vinyl acetate, methylmethacrylate, methylacrylate, ethylacrylate, vinyl benzoate, vinyl pyrrolidone, vinylmethyl ether, vinylbutyl ether, vinylisopropyl ether, vinylisobutyl ether, vinylbutyrate, butadiene or mixtures of ethylacrylate with vinyl acetate, acrylonitrile with styrene, butadiene with acrylonitrile and the like.

It is recognized that the molecular weight and, hence, the ultimate hardness of the polymer can be increased by the utilization during polymerization of a small amount of an unsaturated compound containing at least two terminal vinyl groups each linked to a carbon atom in a straight chain or in a ring. These compounds serve to cross-link the polymeric chains and are generally designated as cross-linking agents. Such agents are described, for example, by Kropa and Bradley in vol. 31, No. 12, of "Industrial and Engineering Chemistry," 1939. Among such cross-linking agents for our purpose may be mentioned N,N'-methylene-bis-acrylamide, triallyl cyanurate, divinyl benzene, divinyl ketones and diglycol-diacrylate.

The cross-linking agent is generally employed in an amount ranging from 10 to 50 parts of monomer to each part of the cross-linking agent. It is understood that the greater the quantity of cross-linking agent within such range, the harder the polymer obtained.

The photopolymerization hereof, depending upon the solubility of the monomer on the one hand and the silver compound on the other, will be carried out in a solvent solution of the involved compounds or in an aqueous dispersion of such components. Typically, if the monomer and silver compound are both water soluble, such as, for example, acrylamide, acrylic acid or the like, and silver nitrate, silver citrate or the like, the monomer and silver salt may be dissolved in a quantity of water sufficient to provide solution, the promoter added, and the polymerization brought about by irradiation. If, however, the monomer and silver salt are soluble in the same organic solvent or in different organic solvents which are, however, miscible with each other, the reaction mixture may be produced by use of such solvents or mixed solvents. For example, methylmethacrylate and silver laurate are both soluble in alcohol and, hence, resort may be had to this solvent for preparing the reaction mixture to which the promoter is added. In lieu of alcohol, use may also be made of such normally liquid organic solvents (i.e., liquid at room temperature) as toluene, acetone, methanol, butylacetate, ethylmethylketone, benzyl alcohol and the like.

It is understood, however, that where an organic solvent system is employed, provision must be made for the presence in the system of a small quantity of water, say about .1 to 5% by weight. The water may be added as such or may be supplied by incorporating in the reaction mixture a humectant such as ethylene glycol, glycerine or the like. When these substances are present, say in an amount of a few percent by weight of the mixture, they absorb sufficient water from the atmosphere to permit photopolymerization to proceed.

Dispersions may also be used in effecting the photopolymerization as previously indicated. These may be formed by dispersing a water insoluble monomer in water by means of a dispersing agent and dispersing the silver compound and promoter in the resulting suspension or dispersion. Suitable dispersing agents are, for example, long chain fatty acid sarcosides or taurides, i.e., oleyl-N-methyl taurine, stearyl sarcosine; keryl benzene sulfonate (made by reacting chlorinated kerosene with benzene and sulfonating the resulting product); the reaction product of from 12 to 20 mols of ethylene oxide with a phenol such as dibutyl phenol, a fatty alcohol, i.e., lauryl alcohol, an amine, i.e., rosin amine or a fatty acid, i.e., stearic acid; dioctyl sulfo succinate; fatty alcohol sulfonates, i.e., $\alpha$-hydroxyoctodecane sulfonic acid, lauryl sulfonate or the like. Dispersions may also be made by dissolving a resin such as ethyl cellulose in toluene and dispersing an aqueous solution or mixture of the monomer and silver compound in the resulting oil.

The pH of the reaction mixture may have a bearing on the rate at which polymerization is initiated. We find that the mixture should not be either too highly acid or too highly alkaline. Preferably we operate at or near the neutral point of the reaction mixture.

If bulk polymerization is desired, the reaction is carried out in any of the usual reactors while irradiating the walls thereof with UV, visible light, X-rays or gamma-rays. If UV or visible light radiation is employed, the walls of the reactors should be of glass or similar materials transparent to these rays. If X- or gamma-radiation is resorted to, the walls may be of any material permeable thereto, such as glass, steel, aluminum or the like.

The UV radiation, either for bulk or imagewise polymerization, may be derived from a carbon arc lamp or a high intensity mercury vapor lamp. Visible radiation may be supplied by photoflash lamps or a tungsten filament lamp. A conventional X-ray machine may serve as a source of such rays, whereas Cobalt 60 may be utilized to supply gamma-radiation. The source of the rays is generally located a short distance, say 4½ to 12", from the walls of the reactor.

The photopolymerization may also be carried out by feeding in monomer, silver compound and amphoteric metal oxide and withdrawing the polymer as formed. For a continuous operation, use may be made of the apparatus described in U.S.P. 2,122,805 granted July 5, 1938.

It has been previously stated that the polymers may be formed not only in bulk but also imagewise. To this end, coatings may be formed consisting of a non-hardened or slightly hardened colloidal layer such as gelatin, PVA or the like, on film or metal, with an emulsion comprising a colloidal carrier such as gelatin, the amphoteric metal oxide, the monomer, a surfactant such as saponin and a humectant such as glycerin and a small quantity of the silver catalyst. When such an emulsion is exposed under a pattern, the polymer is formed imagewise. The image may then be developed by removing unpolymerized monomer by means of water or other suitable solvent.

This procedure may be used in any number of commercial applications. Thus, it may be employed to produce relief printing plates, negative working offset plates or the like. By staining the resist or coating with black or colored inks or dyestuffs or by dispersing a colloidal carbon in the monomeric emulsion, the image density can be increased. Negatives or positives for direct inspection can thus be made by removal of the soluble unpolymerized parts.

In addition to these uses, our invention can be extended to the preparation of printing materials, image transfer materials, printing masks, photolithographic printing plates of all types, lithographic cylinders, printing stencils and printing circuits.

The following examples will serve to illustrate our invention, although it is to be understood that the invention is not restricted thereto.

*Example I*

A composition was prepared from the following components:

| | |
|---|---|
| Acrylamide | g-- 180 |
| N,N'-methylene-bis-acrylamide | g-- 7 |
| Water | cc-- 120 |
| Zinc oxide | g-- .02 |

To 6 cc. of this composition there was added 1 cc. of an aqueous solution containing 3.98 mg. of silver nitrate. By irradiating this composition to the light of a 500 watt tungsten lamp at a distance of 4½" from the light source, the photopolymerization was completed after 7 minutes' exposure with the formation of a solid polymeric mass.

By exposing the same composition without the zinc oxide under exactly the same conditions, polymerization to a solid polymeric mass required 11 minutes.

*Example II*

The procedure was the same as in Example I excepting that the composition was irradiated with UV light produced by a mercury vapor light source. In this case, polymerization was completed after a few minutes. The polymer obtained was similar to that of Example I.

*Example III*

A composition was prepared from the following components:

| | |
|---|---|
| Acrylamide | g-- 180 |
| N,N'-methylene-bis-acrylamide | g-- 7 |
| Water | cc-- 120 |
| Zinc oxide | g-- .02 |

To 6 cc. of this composition there was added 1 cc. of an aqueous solution containing 3.6 mg. of silver nitrite. By irradiation of this composition to the light of a 500 watt tungsten lamp at a distance of 4½", photopolymerization was completed in 3½ minutes with the formation of a solid polymer.

The experiment was repeated excepting that the zinc oxide was eliminated. In this experiment, photopolymerization to a solid mass required double the time, or 7 minutes.

*Example IV*

A composition was prepared from the same components as in Example I. To 6 cc. of this composition there was added 1 cc. of an aqueous solution containing .0046 mg. of silver sulfite.

The composition was irradiated as in Example I excepting that the light source was placed a distance of about 5" from the reactor. Photopolymerization in this case to a solid polymer took about 10 minutes.

With exactly the same composition excepting that the zinc oxide was omitted and under the same conditions, photopolymerization to a solid polymer required 20 minutes.

*Example V*

A composition was prepared as in Example I excepting that there was added .4 mg. of zinc sulfite.

Irradiation of the reaction mixture at a distance of 5" from the light source caused photopolymerization to ensue in 4½ minutes.

Under exactly the same conditions but with the zinc sulfite eliminated, the time of polymerization was 10½ minutes.

*Example VI*

A composition was prepared as in Example III. 24 cc. of this composition containing silver nitrite and zinc oxide were subjected to the light from a 500 watt tungsten lamp source at a distance of approximately 5". This greater quantity of material set to a solid polymer in 22 minutes.

The same amount of the same composition from which the zinc oxide was omitted when irradiated under the same conditions did not set to a solid polymer until about 50 minutes.

*Example VII*

The following composition was prepared from the indicated components:

| | |
|---|---|
| Acrylamide | g-- 180 |
| N,N'-methylene-bis-acrylamide | g-- 7 |
| Water | cc-- 120 |

The above solution was saturated with silver oxide and the clear supernatant liquid decanted. .02 g. of zinc oxide was then added to 6 cc. of this solution. By irradiating the resulting composition with the light source of the previous examples at a distance of 6", photopolymerization ensued in 6 minutes.

By eliminating the zinc oxide, the polymer did not set to a solid mass for a period of 11 minutes.

*Example VIII*

A composition was prepared by dissolving 180 g. of acrylamide in 120 g. of water and adding .02 g. of zinc oxide. To 6 cc. of this composition there was added 1 cc. of an aqueous solution containing 3.6 mg. of silver nitrite. By irradiating this composition to the light of a 500 watt tungsten lamp at a distance of approximately 5", photopolymerization ensued in 6 minutes. Eight minutes, however, were required under the same conditions when the zinc oxide was omitted.

*Example IX*

A composition was prepared from the following components:

| | |
|---|---|
| Acrylamide | g-- 180 |
| N,N'-methylene-bis-acrylamide | g-- 7 |
| Water | cc-- 120 |

The solution was saturated with silver oxide, the supernatant liquid decanted, and then to 6 cc. of this solution were added 1 g. of acrylonitrile and .02 g. of zinc oxide. By irradiating the composition at a distance of 6" from the light source while utilizing the light source of the previous examples, photopolymerization occurred in 25 minutes.

*Example X*

A composition was prepared from the following components:

| | |
|---|---|
| Acrylamide | g-- 180 |
| N,N'-methylene-bis-acrylamide | g-- 7 |
| Water | cc-- 120 |
| Zinc oxide | g-- .02 |

To 1 cc. of this composition there were added 1 cc. of a 10% dispersion of vinyl acetate and 1 cc. of an aqueous solution containing 3.6 mg. of silver nitrite. Irradiation of this composition to the light of a 500 watt tungsten lamp at a distance of 5" caused photopolymerization to ensue in a period of 8 minutes.

*Example XI*

The following composition was prepared:

| | |
|---|---|
| Acrylamide | g-- 180 |
| N,N'-methylene-bis-acrylamide | g-- 7 |
| Water | cc-- 120 |

To 6 cc. of this solution were added 1 cc. of an aqueous solution containing 3.98 mg. of silver nitrate and 1 cc. of a colloidal dispersion containing .23 g. of zirconium dioxide. Photopolymerization ensued by irradiating this composition at a distance of 5″ with a 150 watt tungsten lamp in 11½ minutes. The time for photopolymerization under the same conditions with the same composition omitting the zirconium dioxide required 14 minutes.

Example XII

The following composition was prepared:

| | |
|---|---|
| Acrylamide | g. 180 |
| N,N′-methylene-bis-acrylamide | g. 7 |
| Water | cc. 120 |

To 5 cc. of this solution there were added 1 cc. of an aqueous solution containing 3.98 mg. of silver nitrate and 1 cc. of a 15% dispersion of colloidal silica having a density of 1.44. By irradiation to the light source of Example XI at a distance of 5″, photopolymerization occurred in 14 minutes.

Using the same volume and composition but eliminating the colloidal silica required 17 minutes to effect photopolymerization.

Example XIII

The procedure was the same as in Example XII excepting that there was used 1 cc. of a 30% dispersion of colloidal silica having a density of 1.22. In this case, photopolymerization required only 8 minutes.

Example XIV

A composition for coating was prepared as follows:

| | |
|---|---|
| 10% gelatin | 400 ml. |
| Zinc oxide | 60 g.[1] |
| A solution (hereinafter called W–5) made up from: Acrylamide, 180 g; N,N′-methylene-bis-acrylamide, 7 g; Water, 120 cc | 90 ml. |
| Saponin 8% | 7.2 ml. |
| Glycerin | 3 ml. |

[1] Dispersed in 60 ml. of water.

To 25 ml. of the above composition were added 5 ml. of an aqueous solution containing .25 g. of silver nitrate.

The resulting "emulsion" was coated on filmbase and exposed under a photographic negative or positive to a 375 watt incandescent lamp at a distance of 12″. Photopolymerization imagewise to a hard polymer was realized in 5 seconds. After dissolving out the unpolymerized material, an imagewise photopolymerized resist was obtained.

Example XV

An emulsion was prepared as in Example XIV excepting that the same amount of titanium dioxide was used in lieu of zinc oxide. By exposing the coated emulsion in the same manner as in Example XIV, imagewise photopolymerization occurred in 10 seconds.

Example XVI

An emulsion was prepared in the same manner as in Example XV excepting that there were added 24 cc. of a .1% erythrosin solution. The coated emulsion when exposed to a 375 watt incandescent lamp at a distance of 12″ under a pattern gave imagewise photopolymerization in 2½ seconds.

It will be observed that in this case the dye sensitizer erythrosin greatly accelerated the rate of reaction.

Similar results were obtained when replacing the erythrosin by such optical sensitizers as eosin, pinacyanol and others mentioned above.

Example XVII

The procedure was the same as in Example I excepting that the silver nitrate was replaced by an equivalent quantity of silver acetate. Irradiation as in Example I resulted in photopolymerization in a period of about 12 minutes.

Example XVIII

The procedure was the same as in Example I excepting that the silver nitrate was replaced by an equivalent quantity of silver sulfamate. Irradiation of the composition as in Example I caused photopolymerization to take place in about 10 minutes.

Example XIX 1 g. of vinyl acetate was dispersed in water to produce a 10% dispersion. To this composition were added .02 g. of zinc oxide and 3.6 mg. of silver nitrite. By irradiating the composition with the light source used in Example I at a distance of 5″, photopolymerization occurred in about 10 minutes.

Example XX

An "emulsion" coating solution was prepared as follows:

| | Ml. |
|---|---|
| 10% aqueous gelatin | 400 |
| W–5 | 90 |
| Saponin 8% | 7.2 |
| Glycerin | 3 |

To 30 ml. of this composition was added an aqueous dispersion (30% solids) containing .5 g. of silicon dioxide and .5 g. of silver nitrate.

The resulting "emulsion" was coated on filmbase and dried. The product was then exposed under a pattern to a 375 watt tungsten lamp at 12″. Photopolymerization ensued in a period of 30 seconds.

Example XXI

A colloidal dispersion (30% solids) containing .05 g. of silicon dioxide was added to 2 ml. of W–5 containing .05 g. of silver nitrate. Exposure to a 375 watt incandescent lamp at a distance of 12″ caused photopolymerization to take place in a matter of minutes.

It will be noted that several of the examples deal with the use of silver oxide as the catalyst. The solubility of silver oxide in water equals 0.0022 g. per 100 cc. of water at 20° C., which, in turn, equals 0.22 mg. per 10 cc. It is, therefore, a simple matter to calculate the quantity of silver oxide used in the noted examples.

Modifications of the invention will occur to persons skilled in the art. Thus, in lieu of the monomers described in the examples, any of the monomers mentioned may be employed. Similarly, other silver salts than those of the examples may be utilized, such as silver sulfate, the silver salt of 4-sulfophenyl-3-carboxylic acid-5-pyrazolone, silver benzene sulfinate and the like. We, accordingly, do not intend to be limited in the patent granted except as necessitated by the prior art and the appended claims.

We claim:

1. The process for photopolymerizing normally liquid to normally solid ethylenically unsaturated monomers, which comprises irradiating such monomers in the presence of water while utilizing a catalyst consisting essentially of a mixture of a radiation sensitive compound of silver which is stable in the dark and a promoter compound selected from the group consisting of compounds of zinc, zirconium, titanium and silicon, at least a portion of said last named compounds being selected from the group consisting of zinc oxide, zirconium dioxide, titanium dioxide and colloidal silicon dioxide.

2. The process as defined in claim 1 wherein photopolymerization is effected by radiation with visible light.

3. The process as defined in claim 1 wherein the monomer and silver compound are water soluble and the photopolymerization is effected in the aqueous phase.

4. The process as defined in claim 1 wherein the monomer is water insoluble and the photopolymerization is effected in an aqueous dispersion.

5. The process as defined in claim 1 wherein the monomer and silver compound are soluble in an organic solvent inert to the reactants and the photopolymerization is effected in an organic solvent solution in the presence of a small amount of water.

6. The process as defined in claim 1 wherein the silver compound is a salt of silver and an organic acid and the promoter is zinc oxide.

7. The process as defined in claim 1 wherein the promoter is zinc oxide.

8. The process as defined in claim 1 wherein the promoter is colloidal silica.

9. The process as defined in claim 1 wherein the promoter is colloidal zirconium dioxide.

10. The process as defined in claim 1 wherein the promoter is titanium dioxide.

11. The process as defined in claim 1 wherein the reaction mixture contains an organic compound containing at least two terminal vinyl groups as a cross-linking agent.

12. The process as defined in claim 11 wherein the cross-linking agent is selected from the class consisting of N,N'-methylene-bis-acrylamide, triallylcyanurate, divinylbenzene, divinylketone and diglycol-dioctylate.

13. The process as defined in claim 11 wherein one part of the cross-linking agent is employed for each 10–50 parts of the monomer.

14. The procedure as defined in claim 1 wherein the silver compound is readily oxidizable.

15. The procedure as defined in claim 1 wherein the silver compound and the promoter are used with a readily oxidizable salt of the metal of the promoting oxide.

16. The procedure as defined in claim 14 wherein the silver compound is silver nitrite.

17. The procedure as defined in claim 14 wherein the silver compound is silver sulfite.

18. The procedure as defined in claim 15 wherein the silver catalyst and promoter are used with zinc sulfite.

19. The process as defined in claim 1 wherein photopolymerization is effected in the presence of a small quantity of an optical sensitizing dye.

20. The process as defined in claim 19 wherein the optical sensitizing dye is erythrosin.

21. The process as defined in claim 19 wherein the optical sensitizing dye is eosin.

22. The process as defined in claim 19 wherein the optical sensitizing dye is pinacyanol.

23. A light-sensitive material capable of imagewise photopolymerization, comprising a base coated with a composition comprising a colloidal carrier, an ethylenically unsaturated monomer and a catalyst consisting essentially of a mixture of a radiation sensitive compound of silver which is stable in the dark and a promoter compound selected from the group consisting of compounds of zinc, zirconium, titanium and silicon, at least a portion of said last named compounds being selected from the group consisting of zinc oxide, zirconium dioxide, titanium dioxide and colloidal silicon dioxide.

24. The composition as defined in claim 23 wherein there is present a small amount of an optical sensitizing dye.

25. The composition as defined in claim 23 wherein the colloidal carrier is gelatin.

References Cited in the file of this patent

UNITED STATES PATENTS

| | | |
|---|---|---|
| 2,473,548 | Smith | June 21, 1949 |
| 2,473,549 | Smith | June 21, 1949 |
| 2,510,426 | Smith | June 6, 1950 |
| 2,875,047 | Oster | Feb. 24, 1959 |